US010607226B2

(12) United States Patent
Patel et al.

(10) Patent No.: US 10,607,226 B2
(45) Date of Patent: Mar. 31, 2020

(54) SYSTEM AND METHOD FOR FRAUD DETECTION IN A MOBILE DEVICE

(71) Applicant: Samsung Electronics Co., Ltd., Gyeonggi-do (KR)

(72) Inventors: Kunal M. Patel, Sunnyvale, CA (US); Abraham J. Kang, Los Gatos, CA (US); Bulent Kasman, Antioch, CA (US); Peng Ning, Saratoga, CA (US); Michael C. Grace, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 981 days.

(21) Appl. No.: 14/962,365

(22) Filed: Dec. 8, 2015

(65) Prior Publication Data

US 2016/0307199 A1 Oct. 20, 2016

Related U.S. Application Data

(60) Provisional application No. 62/147,012, filed on Apr. 14, 2015.

(51) Int. Cl.
*G06Q 40/00* (2012.01)
*G06Q 20/40* (2012.01)
*G06Q 20/32* (2012.01)

(52) U.S. Cl.
CPC ......... *G06Q 20/4016* (2013.01); *G06Q 20/32* (2013.01); *G06Q 40/00* (2013.01)

(58) Field of Classification Search
CPC ...................................... G06Q 40/00
See application file for complete search history.

(56) References Cited

U.S. PATENT DOCUMENTS

| 8,626,663 B2 | 1/2014 | Nightengale et al. |
| 2003/0130919 A1* | 7/2003 | Templeton ............. G06Q 40/00 705/35 |

(Continued)

FOREIGN PATENT DOCUMENTS

| CN | 101116090 A | 1/2008 |
| CN | 104408610 A | 3/2015 |

OTHER PUBLICATIONS

Terri Bradford, Where Social Networks, Payments and Banking Intersect, Dec. 2012, Federal Reserve Bank of Kansas City, web, 2-5 (Year: 2012).*

(Continued)

*Primary Examiner* — I Jung Liu

(57) ABSTRACT

A user device comprising: i) transmit path circuitry and receive path circuitry configured to communicate with a payment server; and ii) processing circuitry configured to control the transmit path circuitry and receive path circuitry. The processing circuitry is further configured to: a) receive a user input related to a payment process; b) calculate a risk score indicative of a likelihood of fraudulent activity associated with the payment process, wherein the risk score calculation is based on confidential information associated with the user that is stored on the user device; and c) transmit to the payment server a payment action and the risk score associated with the payment action without disclosing the confidential information. The confidential information comprises personally identifiable information and/or private information of the user. The processing circuitry calculates the risk score using a risk base model received from a model server.

20 Claims, 5 Drawing Sheets

(56) References Cited

U.S. PATENT DOCUMENTS

| | | |
|---|---|---|
| 2004/0199462 A1 | 10/2004 | Starrs |
| 2005/0283429 A1 | 12/2005 | Bates et al. |
| 2006/0175394 A1 | 8/2006 | Caven et al. |
| 2009/0307778 A1 | 12/2009 | Mardikar |
| 2013/0024238 A1 | 1/2013 | Nielson et al. |
| 2014/0289833 A1* | 9/2014 | Briceno ................ H04L 63/08 726/5 |
| 2014/0344155 A1* | 11/2014 | Liu ...................... G06Q 20/40 705/44 |
| 2015/0095407 A1 | 4/2015 | Li et al. |

OTHER PUBLICATIONS

International Search Report dated Jun. 30, 2016 in connection with International Patent Application No. PCT/KR2016/003844.

Written Opinion of the International Searching Authority dated Jun. 30, 2016 in connection with International Patent Application No. PCT/KR2016/003844.

Extended European Search Report regarding Application No. 16780267.7, dated Nov. 27, 2017, 6 pages.

China National Intellectual Property Administration, "Notification of the First Office Action," Application No. CN201680021740.0, dated Dec. 30, 2019, 15 pages.

\* cited by examiner

SYSTEM AND METHOD FOR FRAUD DETECTION IN A MOBILE DEVICE

CROSS-REFERENCE TO RELATED APPLICATION AND CLAIM OF PRIORITY

The present application is related to U.S. Provisional Patent No. 62/147,012, filed 14 Apr. 2015 and entitled "PRIVACY PRESERVING FRAUD DETECTION". Provisional Patent No. 62/147,012 is assigned to the assignee of the present application and is hereby incorporated by reference into the present application as if fully set forth herein. The present application hereby claims priority under 35 U.S.C. § 119(e) to U.S. Provisional Patent No. 62/147,012.

TECHNICAL FIELD

The present application relates generally to mobile communication devices and, more specifically, to a method of fraud detection in a smartphone that preserves user privacy.

BACKGROUND

Mobile devices, such as smartphone and tablets, typically include one or more mobile payment applications, such as Samsung Pay and the like, that allow a user to register one or more credit cards or debit cards on his or her mobile device in order to make payments from the credit card account through the mobile device. Payment systems dealing with credit card or debit card information historically have had to deal with fraudulent card use, whether through the malicious theft of information or through the malicious usage of a stolen credit/debit card (fraudulent payment card use).

Detecting fraudulent payment card use typically requires access to a large amount of both personally identifiable information of the cardholder and private information of the cardholder. However, it could potentially be damaging to the user if the private information of the user becomes associated with personally identifiable information of the user. As a result, conventional fraud detection systems seek to balance the accuracy of fraud detection with the need to collect personally identifiable information and/or private information.

Therefore, there is a need in the art for improved apparatuses and methods for preventing fraud in mobile payment systems that use credit and/or debit cards. In particular, there is a need for smartphone payment systems and applications that minimize the exposure to payment systems of personally identifiable information of the cardholder and private information of the cardholder.

SUMMARY

To address the above-discussed deficiencies of the prior art, it is a primary object to provide a user device comprising: i) transmit path circuitry and receive path circuitry configured to communicate with a payment server; and ii) processing circuitry configured to control the transmit path circuitry and receive path circuitry and further configured to: a) receive a user input related to a payment process; b) calculate a risk score indicative of a likelihood of fraudulent activity associated with the payment process, wherein the risk score calculation is based on confidential information associated with the user that is stored on the user device; and c) transmit to the payment server a payment action and the risk score associated with the payment action without disclosing the confidential information.

In one embodiment, the confidential information comprises personally identifiable information of the user.

In another embodiment, the confidential information comprises private information of the user.

In still another embodiment, the processing circuitry calculates the risk score using a risk base model received from a model server.

In yet another embodiment, the processing circuitry is further configured to transmit to the model server a suggested parameter update usable by the model server to improve the accuracy of the risk base model.

In a further embodiment, the risk base model is based on a neural network.

In a yet further embodiment, the risk base model is based on a decision tree.

In a still further embodiment, the processing circuitry is further configured to transmit to the payment server a justification corresponding to each risk score.

It is another object to provide a method for use in a user device, the method comprising: i) communicating with a payment server; ii) receiving a user input related to a payment process; iii) calculating a risk score indicative of a likelihood of fraudulent activity associated with the payment process, wherein the risk score calculation is based on confidential information associated with the user that is stored on the user device; and iv) transmitting to the payment server a payment action and the risk score associated with the payment action without disclosing the confidential information.

It is further object to provide a non-transitory computer readable medium configured to control a processor to perform a method of processing payments, the method comprising: i) communicating with a payment server; ii) receiving a user input related to a payment process; iii) calculating a risk score indicative of a likelihood of fraudulent activity associated with the payment process, wherein the risk score calculation is based on confidential information associated with the user that is stored on the user device; and iv) transmitting to the payment server a payment action and the risk score associated with the payment action without disclosing the confidential information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device.

Figure 1:
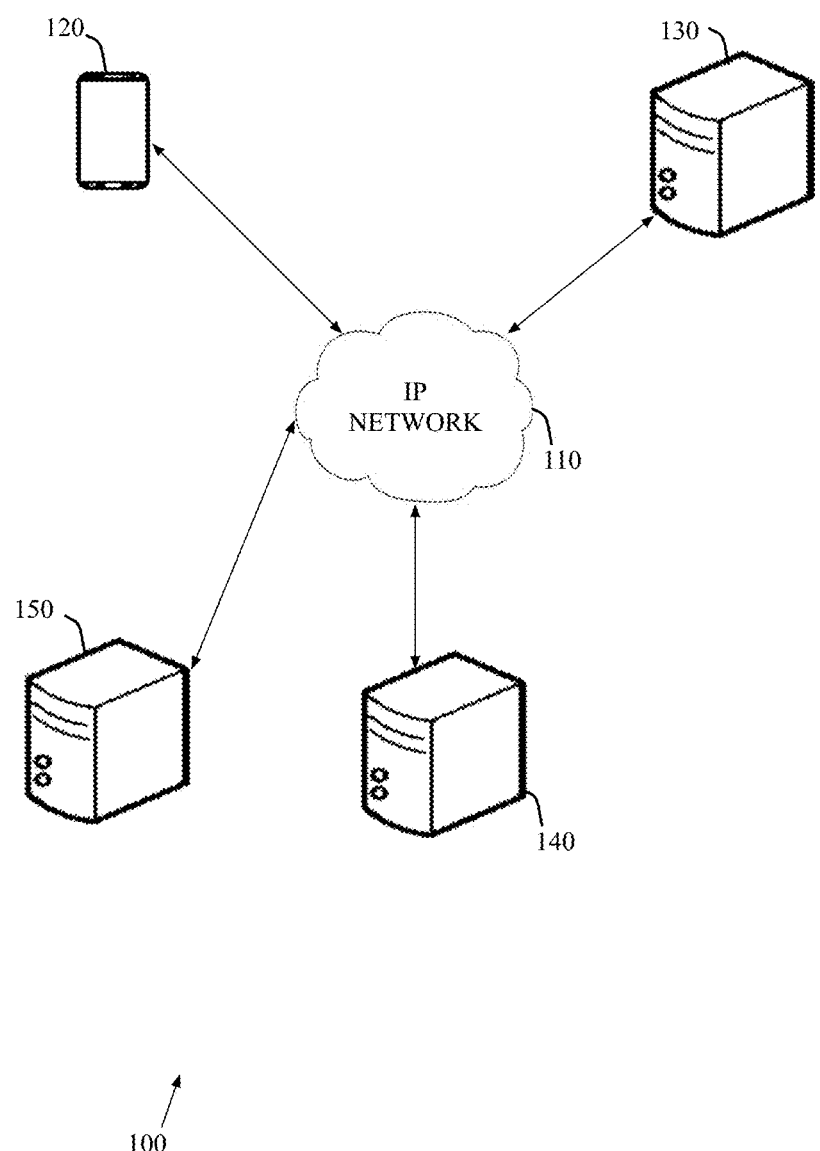
FIG. 1 illustrates a mobile payment system according to the principles of the disclosure.

FIG. 1 illustrates mobile payment system 100 according to an embodiment of the present disclosure. Mobile payment system 100 comprises user device 120, cloud server 130, interface server 140, and payment server 150, each of which is configured to communicate with one or more other devices through Internet protocol (IP) network 110, such as Internet 110. In the exemplary embodiment, user device 120 is assumed to be mobile phone 120. However, alternatively, user device 120 may be any one of a tablet, a smart television, a laptop personal computer, or another type of consumer information appliance.

A payment application on user device 120 may communicate with cloud server 130 to receive risk-related information and updates. The payment application on user device 120 also communicates with interface server 140 and payment server 150 to make on-line payments based on credit cards and/or debits cards. If user device 120 is an Android OS-based system, the payment application may be, for example, Samsung Pay.

In a conventional on-line payment system, one or more interface servers 140 would be responsible for collecting from user device 120 the confidential information (e.g., personally identifiable information, private information) of the user/cardholder in order to calculate a risk score that could be used to detect fraud. Interface server 140 would typically report the risk score to payment server 150, which may reject the payment request from user device 120 if the risk score is too high. According to the principles of the disclosure, user device 120 minimizes the exposure of the confidential information (e.g., personally identifiable information, private information) of the cardholder and improves fraud detection accuracy without revealing the personally identifiable or private information. The personally identifiable and private information may include, for example, the name and address of the user, the workplace of the user, the social security number of the user, the location of the user, the recent purchases of the user, movement behavior of the user, usage patterns of certain applications, frequency of changes to telephony information (e.g., phone numbers), and the like.

Accordingly, the personally identifiable and private information remains on user device 120 where that information originated. The payment application on user device 120 is configured to assess risk and detect fraud without revealing the personally identifiable and private information to third parties or to external servers. In one embodiment, risk scores are calculated on user device 120, but the algorithm and algorithm parameters used to calculate risk scores may be controlled by one or more interface servers 140.

User device 120 determines the risk of fraudulent activity using the personally identifiable and private information that user device 120 collects. User device 120 reveals a risk score along with a payment action (e.g., payment request) to interface servers 140 and payment servers 150. User device 120 optionally provides selected information to central server (i.e., cloud server 130) that allows server 130 to improve the risk calculation algorithm used by user devices 120. User device 120 does not reveal the personally identifiable or private information of the user used to compute the improvements to cloud server 130.

In an advantageous embodiment, the exemplary outputs of user device 120 comprise: i) one or more risk scores; ii) a set of privacy-preserving justifications corresponding to each risk score; and iii) parameter updates.

Risk Scores—Each output risk score may be used individually as an indicator of various factors expected to be useful for fraud detection. For example, one type of risk score may reflect the likelihood (e.g., a percentage probability) that the owner of user device 120 is not the owner of a card being registered. Another type risk score may reflect the likelihood that the current user of user device 120 is not the legitimate owner of user device 120. A third type of risk score may convey the likelihood that the user is attempting to hide his or her location while using the payment application.

Privacy-preserving justifications for risk scores—Each output risk score may be the outcome of a plurality of highly-indicative justifications that may be easy to understand by human third parties. For example, if an output risk score indicates that the user is likely trying to hide his or her location while using the payment application, at least part of the justification may be that the user is connecting the payment application to payment server 150 or interface server 140 through an internet public proxy.

Parameter updates—Each risk score may be computed based on a given set of randomly distributed parameters. External parties cannot use the parameter updates for the purpose of guessing the private information for a specific user device 120 or a specific user. This ensures that parameter updates alone cannot be used to leak sensitive information about individual users. However, parameter updates in the aggregate across many user devices 120 may be used to identify indicators of fraud. Details of how parameters and parameter updates are calculated are described below.

Due to the privacy-preserving nature of this system, one embodiment of the method for computing the risk score may have the following constraints. First, the parameters involved with computing the risk score must be separable into a vector of private information and a vector of risk parameters. The risk parameters must be independent of private information to ensure that risk parameter updates may be revealed without leaking private information. Second, because the risk score calculation should be updatable as the system becomes more robust, it must be possible for the risk parameters to be updatable. Third, it must be possible for risk parameter update values to be aggregated and for the aggregate risk parameter updates to be usefully applied to any existing vector of risk parameters. Fourth, in order to provide justifications for output risk scores, it must be possible to determine the relative contributions of each component of the vector of private information to the final risk scores. Finally, in order to hide the correlation between the vector of private information and parameter updates, there must always be multiple possible associated private information vectors for any given parameter update.

Figure 2:
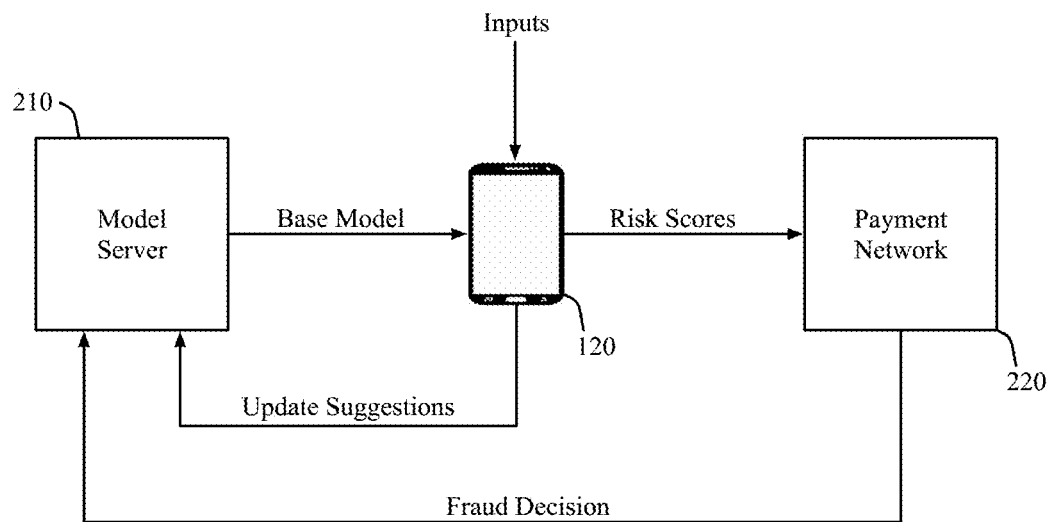
FIG. 2 illustrates a method of updating parameters of a risk model according to an embodiment of the disclosure.

FIG. 2 illustrates a method of updating parameters of a risk base model according to an embodiment of the present disclosure. Model server 210 (e.g., cloud server 130) provides a risk base model for determining risk to user device 120. User device 120 receives from the user multiple inputs, including personally identifiable and private information of the user. Using the risk base model and the inputs, user device 120 calculates one or more risk scores, which are transmitted to payment network 220 (e.g., interface server(s) 140 and payment server(s) 150) as part of a payment action. This may include, for example, transmitting the risk score(s) as part of card enrollment data. From time-to-time, user device 120 also transmits parameter update suggestions to model server 210 to improve the accuracy of the risk calculation base model.

Model overview—The underlying model abstraction that is used is as follows:

$$risk = f(input; parameters), \quad [Eqn. 1]$$

where the value "risk" represents the vector of output risk scores, the variable "parameters" represents the vector of model parameters that—when combined with function "$f$"—completely define the risk calculation, and the variable "input" represents the vector of both input private information and input non-private information. In the case of a linear model, the risk value may be a vector of scalar values ranging from $-\infty$ to $+\infty$, the parameters variable may contain the coefficients of each input variable, and the input variable may be a vector of probabilities.

Figure 4:
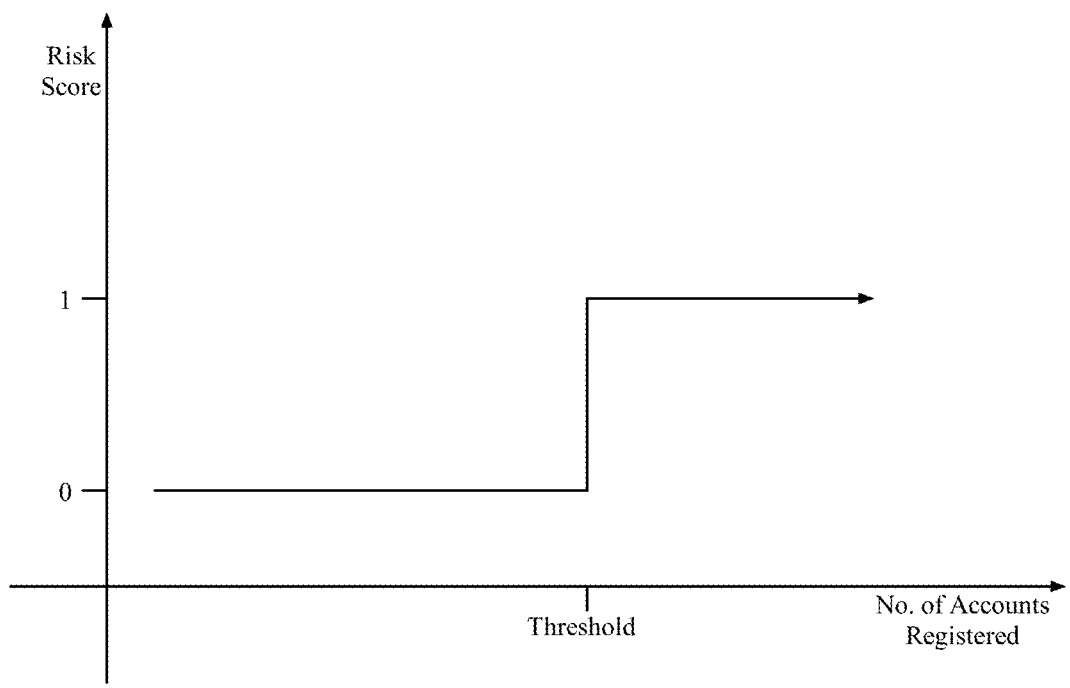
FIG. 4 illustrates one of a disjunction of step functions according to an exemplary embodiment of the disclosure.

Example Model—Disjunction of Step Functions—FIG. 4 illustrates a risk model based on one of a disjunction of step functions according to an exemplary embodiment. In this exemplary model, the risk function $f$ is the maximum of a set of step functions parameterized by thresholds. Each step function is treated independently. In this scenario, user device 120 compares an input (e.g., the number of times an account has been registered in the last week) to the threshold value. If the input value is greater than the threshold, the action is considered a high risk. Otherwise, the action is considered a low risk.

Example Model—Neural Network—In this exemplary risk calculation model, the risk function $f$ is a neural network parameterized by weights. As an example, the inputs are all converted to numerical values and then converted to a risk score as follows:

$$hidden_1 = sigmoid(\Sigma input_i * weight_{1i}) \quad [Eqn. 2]$$

$$hidden_2 = sigmoid(\Sigma hidden_{1i} * weight_{2i}) \quad [Eqn. 3]$$

$$risk = sigmoid(\Sigma hidden_{2i} * weight_{3i}) \quad [Eqn. 4]$$

If the output risk score is close to one, the action is considered to be high risk. Otherwise, the action is considered to be low risk.

Example Model—Decision Tree—In this exemplary risk calculation model, the risk function $f$ is a decision tree parameterized by: i) the hierarchy of decisions; ii) the parameters required for each individual decision; and iii) the risk score output by each leaf of the decision tree. In this risk model, user device 120 computes a series of Boolean values based on the input. For example, the first decision may be to determine whether or not user device 120 has been used to register more than some threshold number of accounts. If the result is true, then the second decision may be to determine whether or not a card exists on user device 120. Otherwise, the second decision may be to determine whether or not the cardholder name matches the name associated with the new account. This continues until a decision outputs whether or not an action is a high risk.

Exemplary Model Inputs—According to the principles of the disclosure, user device 120 may use certain observable actions or conditions as indications of: i) the user attempting to obfuscate his or her identity; ii) the use of stolen identities; or iii) unusual activity. These observable actions or conditions may include: a) the use of an Internet proxy server. In this case, the actual information being hidden by the proxy may be considered private information and may be used an input to the risk calculation model; b) attempts to register many accounts with different information; c) the existence of many different cardholder names. The cardholder names and relationship implied may be considered private information and may be used as an input to the risk calculation model; d) earlier reports of fraudulent activity associated with user device 120; and e) repeatedly resetting or updating payment-related or account-related data.

Selecting Model Parameters—According to the principles of the disclosure, user device 120 makes use of device-generated parameter updates. To maximize the usefulness of such parameter updates, these parameter updates are based on the aggregate of many device parameters that result in some known statistic. To accomplish this, model server 210 (e.g., cloud server 130) may generate base model parameters (see FIG. 2). These parameters may be randomly generated or manually selected by a system operator. In order to hide the correlation between the private input vector and the public output risk vector, user device 120 may perturb the model parameters based on a distribution passed down from model server 210, such as:

$$random_{device} = random(; distribution_{server}) \quad [Eqn. 5]$$

$$parameters_{device} = parameters_{server} + random_{device} \quad [Eqn. 6]$$

$$risk = f(input; parameters_{device}) \quad [Eqn. 7]$$

Model server 210 ensures that when the random distribution that model server 210 generates is combined with the parameters model server 210 generates, the random distribution will have the statistics necessary for parameter updates to be useful. For example, model server 210 may require the mean value of a given user device 120 parameter to be equal to a selected value. Thus, model server 210 may send a server parameter equal to the selected value along with a random distribution with a mean value of zero. In cases where private information will not be leaked regardless of the contents of the parameter updates, model server 210 may send a distribution that takes a constant value. For example, the distribution may always take the value of zero.

Example Parameter Selection—Disjunction of Step Functions—As mentioned above, the threshold values are considered parameters when dealing with a disjunction of step functions. In this scenario, user device 120 may perturb the parameters by a random value, for example, one selected from a Gaussian distribution. A Gaussian distribution is itself described by two parameters, a mean and a variance, which are selected by model server 210. User device 120 generates a random number using the server-provided mean and variance and adds that random number value to a threshold value. User device 210 repeats this process for each threshold parameter. User device 210 uses the perturbed threshold values when computing a risk score.

Example Parameter Selection—Neural Network—As mentioned above, the weights are considered parameters in a neural network. As in the case of disjunction of step functions, user device 120 may perturb each weight by a separate random number selected from the Gaussian distribution. User device 120 uses the perturbed values when computing a risk score.

Example Parameter Selection—Decision Tree—As mentioned above, the hierarchy of decisions and the output risk scores are the parameters of a decision tree. Each decision may implicitly contain a threshold, which may be perturbed by user device 120 by a random number selected from the Gaussian distribution. User device 120 may also perturb the output risk score by drawing from another Gaussian distribution. In this example, user device 120 would not randomly modify the hierarchy of decisions in the decision tree.

Identifying Justifications—User device 120 provides justifications for a given risk score based on components of the private input vector that most drastically affect the result. For example, user device 120 may determine justifications by the following methods. In one method, user device 120 directly tests a set of rules against a private input vector. The rules may be parameterized. For example, the time since last usage may be tested against some parameterized threshold. In a second method, user device 120 may re-compute the risk score using the negation(s) of each input component. The negations that most drastically affect a risk score are tested against a set of rules.

If user device 120 re-computes a risk score using negations of an input vector component, the component may have a finite number of negations. For example, a component that takes categorical values may have a negation that represents all other values in the same category. A component that represents a probability of an event occurring may have a negation that represents the probability of that event not occurring. In cases where the negation of a component is not well defined, user device 120 may determine the contribution of a parameter to the risk score by a more complex operation. For example, determining the contribution of a time parameter may involve integrating the distribution of potential risk scores, weighted by a Gaussian distribution, with respect to time.

When user device 120 generates risk scores, user device 120 may also generate parameter update values and may send these to model server 210 (i.e., cloud server 130) along with the risk scores. The parameter update values represent a set of changes to device-specific parameters that should be made for the computed risk scores to be more accurate. User device 120 generates two sets of parameter update values for each risk score: i) the parameter changes to make given that the current action is not fraudulent; and ii) the parameter changes to make given that the current action is fraudulent. The actual calculation for parameter updates depends on the interpretation of the risk score being computed. The parameter update for a given component may be rule-based or may involve computing the gradient of an error term with respect to each private input parameter.

Model server 210 retains the sets of parameter changes for a fixed period of time. If the action is later found to be fraudulent, the second set of parameter changes are used to update the base model parameters of model server 210. If within the fixed period of time the action is not found to be fraudulent, the first set of parameter changes is used. All parameter changes for a given model are aggregated and applied to the current model in order to generate a new model. The new model base parameters are pushed to every user device 120 along with a new random distribution. Each user device 120 then selects a new device-specific model based on the updated information and computes risk scores and parameter updates using the new model.

Figure 5:
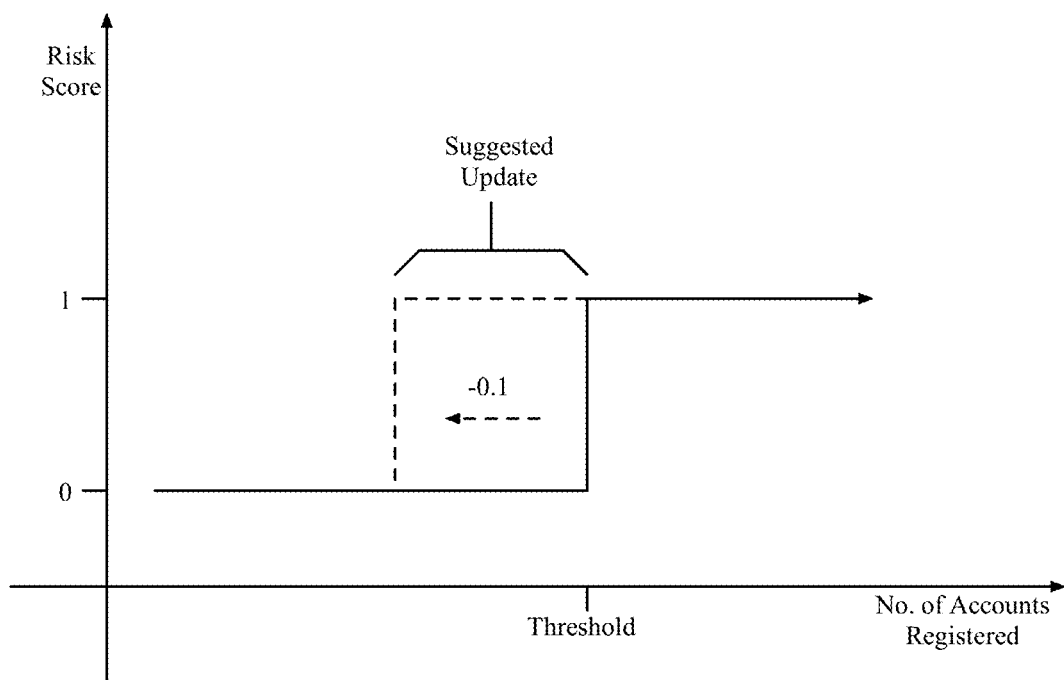
FIG. 5 illustrates updating thresholds for one of a disjunction of step functions according to another exemplary embodiment of the disclosure.

Example Updates—Disjunction of Step Functions—FIG. 5 illustrates updating thresholds for one of a disjunction of step functions. As mentioned above, the thresholds are considered parameters when dealing with a disjunction of step functions. Referring to FIG. 2, when computing a risk score, user device 120 may compute update suggestions in the following way. First, if a threshold is not passed, then user device 120 may suggest: i) lowering the threshold by a fixed amount if the action is later found to be fraudulent; and ii) no changes if the action is not found to be fraudulent. Alternatively, if the threshold is passed, then user device 120 may suggest: i) no changes if the action is later found to be fraudulent; and ii) raising the threshold by a fixed amount if the action is later found not to be fraudulent.

Many suggestions may be aggregated on model server 210, which may apply the suggestions to a base set of thresholds. This process may be repeated until there are an equal number of user devices 120 that suggest lowering the threshold as there are user devices 120 that suggest raising the threshold. Because each user device 120 randomizes the threshold, it cannot be stated with certainty that a user device 120 input was greater than or less than the server-provided threshold.

Example Updates—Neural Network—As mentioned above, the weights are considered parameters when dealing with a neural network. When computing a risk score, user device 120 may compute updates in the following way:

Step 1—User device 120 computes the mean-square error of the output risk score assuming that the action is fraudulent. The error here would be the difference of the output risk score from 1.0.

Step 2—User device 120 compare the gradient of the mean-squared error with respect to each weight parameter.

Step 3—User device 120 multiplies the gradient by a fixed value (the learning rate) and suggests the scaled gradient as the update value for when the action is found to be fraudulent.

Steps 1-3 are repeated assuming the action is not fraudulent. This means treating the error as the difference of the output risk score from 0.0. Many gradients may be aggregated on model server 210, which may add the aggregated values to the base set of weights. User device 120 may repeat this process until the aggregate gradient is equal to zero for all parameters.

Figure 3:
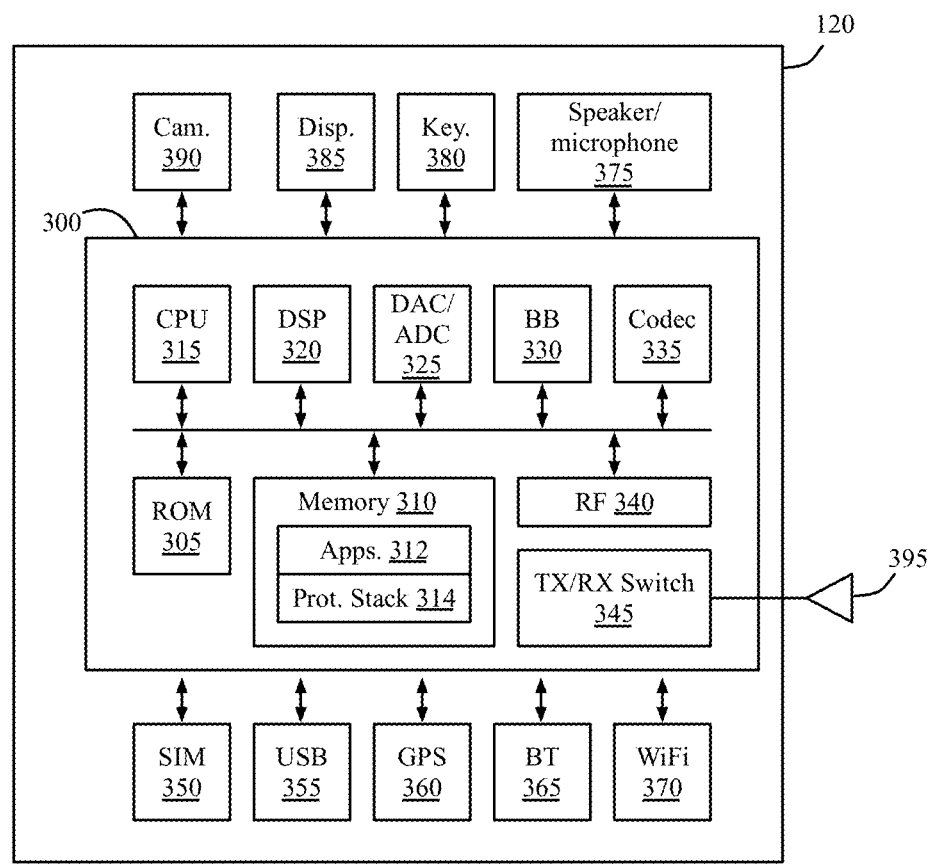
FIG. 3 illustrates in greater detail exemplary mobile phone 120 that calculates fraud detection risk scores according to an embodiment of the disclosure

FIG. 3 illustrates in greater detail exemplary user device 120 that calculates fraud detection risk scores according to an embodiment of the disclosure. In FIG. 3, user device 120 is implemented as mobile phone 120. However, this is by way of illustration only and should not be construed to limit the scope of the disclosure. In alternate embodiments, mobile phone 120 may instead be a tablet, a smart TV, a laptop computer, or any other information appliance.

Mobile phone 120 comprises core circuitry 300, which includes read-only memory (ROM) 305, random access memory (RAM) 310, central processing unit (CPU) 315, digital signal processor (DSP) 320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. Applications 312 in memory may include a social presence application (i.e., RCS Presence) that interacts with carrier SP server 150, an IP multimedia subsystem (IMS) framework that delivers IP multimedia services, a Calendar application that communicates with calendar server 160, and specific Social Network Site (SNS) applications (e.g., Facebook, Twitter), and the like that enable mobile phone 120 to exchange SP information with mobile phones used by other subscribers.

Mobile phone 120 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 120. In an exemplary embodiment, CPU 315 executes applications 312 and protocol stack 314. CPU 315 runs the application layer and a wide variety of applications may be run in a smart phone implementation. Applications 312 may include audio, video, browser, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian, java, android, RT-Linux, Palm, and the like. For time critical applications, CPU 315 runs a real-time operating system (RTOS). In addition to the physical layer, there are other layers, including protocol stack 314, that enable mobile phone 120 to work with a network base station. In an exemplary embodiment, protocol stack 314 is ported on CPU 315.

DAC/ADC circuitry block 325 converts analog speech signals to digital signals, and vice versa, in mobile phone 120. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 120. BB circuitry block 330 converts voice and data to be carried over the air interface to I/Q baseband signals.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electro-magnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 120, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RX switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands. Mobile phone 120 provides connectivity with laptops or other devices using WiFi (or WLAN) transceiver 370, BT transceiver 365, and universal serial bus (USB) interface 355. Mobile phone 120 also uses GPS receiver 360 in applications 312 that require position information. If mobile phone 120 is a conventional smart phone, applications 312 may include many popular applications, such as Facebook, Twitter, a browser, and numerous games that come pre-installed with mobile phone 120.

Speaker and microphone circuitry block 375 comprises microphone circuitry (or mic) that converts acoustic energy (i.e., air pressure changes caused by speech or other sounds) to electrical signals for subsequent processing. Speaker and microphone 375 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal. Mobile phone 120 preferably includes camera

390. Presently, almost all mobile phones feature a camera module. Camera 390 may comprise a 12 megapixel, 14 megapixel, or a 41 megapixel camera. Display 385 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 380 may comprise a simple matrix type keypad that contains numeric digits (0 to 9), alphabetic characters (A to Z), special characters, and specific function keys. In a more advanced embodiment for a smart phone implementation, keypad 380 may be implemented in the mobile phone software, so that keyboard 380 appears on display 385 and is operated by the user using the touch of a finger tip.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user device comprising:
   transmit path circuitry and receive path circuitry configured to communicate with a payment server; and
   processing circuitry configured to:
      receive a user input related to a payment process,
      calculate a risk score,
      detect potentially fraudulent activity as a function of the risk score, wherein the risk score is indicative of a likelihood of fraudulent activity associated with the payment process, and wherein the risk score calculation is based on confidential information associated with a user that is stored on the user device and updatable parameters,
      generate two sets of parameter update values for the risk score, wherein a first set of parameter update values relates to changes to make if fraudulent activity is not detected and a second set of parameter update values relates to changes to make if fraudulent activity is detected, and
      transmit, to the payment server, a payment action and the risk score associated with the payment action without disclosing the confidential information.

2. The user device as set forth in claim 1, wherein the confidential information comprises personally identifiable information of the user.

3. The user device as set forth in claim 1, wherein the confidential information comprises private information of the user.

4. The user device as set forth in claim 1, wherein the processing circuitry calculates the risk score using a risk base model received from a model server.

5. The user device as set forth in claim 4, wherein the processing circuitry is further configured to transmit to the model server the two sets of parameter update values usable by the model server to improve accuracy of the risk base model.

6. The user device as set forth in claim 4, wherein the risk base model is based on a neural network.

7. The user device as set forth in claim 4, wherein the risk base model is based on a decision tree.

8. The user device as set forth in claim 1, wherein the processing circuitry is further configured to transmit to the payment server a justification corresponding to the risk score.

9. For use in a user device, a method comprising:
   communicating with a payment server;
   receiving a user input related to a payment process;
   calculating, by a mobile electronic device, a risk score;
   detecting potentially fraudulent activity as a function of the risk score, wherein the risk score is indicative of a likelihood of fraudulent activity associated with the payment process at the mobile electronic device, and wherein the risk score calculation is based on confidential information associated with a user that is stored on the user device;
   generating two set of parameter update values for the risk score, wherein a first set of parameter update values relates to changes to make if fraudulent activity is not detected and a second set of parameter update values relates to changes to make if fraudulent activity is detected; and
   transmitting, to the payment server, a payment action and the risk score associated with the payment action without disclosing the confidential information.

10. The method as set forth in claim 9, wherein the confidential information comprises personally identifiable information of the user.

11. The method as set forth in claim 9, wherein the confidential information comprises private information of the user.

12. The method as set forth in claim 9, wherein calculating the risk score comprises calculating the risk score using a risk base model received from a model server.

13. The method as set forth in claim 12, further comprising:
   transmitting to the model server the two sets of parameter update values usable by the model server to improve accuracy of the risk base model.

14. The method as set forth in claim 12, wherein the risk base model is based on a neural network.

15. The method as set forth in claim 12, wherein the risk base model is based on a decision tree.

16. The method as set forth in claim 9, further comprising:
   transmitting to the payment server a justification corresponding to the risk score.

17. A non-transitory computer readable medium including a plurality of instructions that, when executed by a processor, are configured to cause the processor to detect potentially fraudulent activity by a user of an electronic device including the processor by:
   communicating with a payment server;
   receiving a user input related to a payment process;
   calculating a risk score;
   detecting potentially fraudulent activity as a function of the risk score, wherein the risk score is indicative of a likelihood of fraudulent activity associated with the payment process, and wherein the risk score calculation is based on confidential information associated with the user that is stored on the user device and updatable parameters;
   generating two sets of parameter update values for the risk score, wherein a first set of parameter update values relates to changes to make if fraudulent activity is not detected and a second set of parameter update values relates to changes to make if fraudulent activity is detected; and
   transmitting to the payment server a payment action and the risk score associated with the payment action without disclosing the confidential information.

18. The non-transitory computer readable medium as set forth in claim 17, wherein the confidential information comprises personally identifiable information of the user.

19. The non-transitory computer readable medium as set forth in claim 17, wherein the confidential information comprises private information of the user.

20. The non-transitory computer readable medium as set forth in claim 17, wherein the plurality of instructions is configured to cause the processor to:
- calculate the risk score using a risk base model received from a model server; and
- transmit to the model server the two sets of parameter update values usable by the model server to improve accuracy of the risk base model.

* * * * *